United States Patent
Li et al.

(10) Patent No.: US 12,506,944 B2
(45) Date of Patent: Dec. 23, 2025

(54) ELECTRONIC DEVICE, AND CAMERA MODULE THEREOF WITH MOVABLE PHOTOSENSITIVE SHIP

(71) Applicant: VIVO MOBILE COMMUNICATION CO., LTD., Dongguan (CN)

(72) Inventors: Peide Li, Dongguan (CN); Yunfa He, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 256 days.

(21) Appl. No.: 18/216,572

(22) Filed: Jun. 29, 2023

(65) Prior Publication Data

US 2023/0345102 A1 Oct. 26, 2023

Related U.S. Application Data

(63) Continuation of application No. PCT/CN2021/142408, filed on Dec. 29, 2021.

(30) Foreign Application Priority Data

Dec. 31, 2020 (CN) .......................... 202011639272.8

(51) Int. Cl.
*H04N 5/335* (2011.01)
*H04N 23/55* (2023.01)
*H04N 23/958* (2023.01)
*H04N 25/11* (2023.01)

(52) U.S. Cl.
CPC ........... *H04N 23/55* (2023.01); *H04N 23/958* (2023.01); *H04N 25/11* (2023.01)

(58) Field of Classification Search
CPC ...................................................... H04N 25/48
See application file for complete search history.

(56) References Cited

U.S. PATENT DOCUMENTS

| | | | | |
|---|---|---|---|---|
| 5,182,652 A | * | 1/1993 | Stephenson, III . | H04N 1/19505 348/250 |
| 5,335,091 A | * | 8/1994 | Palum ..................... | H04N 25/48 358/296 |

(Continued)

FOREIGN PATENT DOCUMENTS

| | | |
|---|---|---|
| CN | 101533205 A | 9/2009 |
| CN | 104079904 A | 10/2014 |

(Continued)

OTHER PUBLICATIONS

Extended European Search Report issued in related European Application No. 21914479.7, mailed Mar. 4, 2024, 9 pages.

(Continued)

*Primary Examiner* — Gary C Vieaux
(74) *Attorney, Agent, or Firm* — IPX PLLC

(57) ABSTRACT

An electronic device and a camera apparatus are provided. The camera apparatus includes a lens, a driving member, and a photosensitive chip. The photosensitive chip is a Bayer array sensor. The photosensitive chip includes a plurality of pixel regions arranged in rows and columns, and each pixel region includes four pixel sub-regions. The photosensitive chip is connected to the driving member, and the driving member is configured to drive the lens to move between a first position and a second position relative to the lens. When the photosensitive chip is in the first position, light incident from the lens forms a first image in a first pixel sub-region of the photosensitive chip. When the photosensitive chip is in the second position, light incident from the lens forms a second image in a second pixel sub-region of the photosensitive chip.

10 Claims, 4 Drawing Sheets

(56) References Cited

U.S. PATENT DOCUMENTS

| | | | |
|---|---|---|---|
| 6,195,125 B1* | 2/2001 | Udagawa | H04N 25/134 |
| | | | 348/222.1 |
| 6,670,986 B1* | 12/2003 | Ben Shoshan | H04N 23/58 |
| | | | 348/374 |
| 7,236,650 B1 | 6/2007 | Omori et al. | |
| 8,917,327 B1 | 12/2014 | Bishay | |
| 2002/0060743 A1* | 5/2002 | Hori | H04N 25/48 |
| | | | 348/E9.01 |
| 2010/0103294 A1* | 4/2010 | Min | H04N 23/84 |
| | | | 348/294 |
| 2014/0267890 A1 | 9/2014 | Lelescu et al. | |
| 2017/0118453 A1* | 4/2017 | Kim | H04N 23/84 |
| 2018/0264866 A1 | 9/2018 | Raymond et al. | |

FOREIGN PATENT DOCUMENTS

| | | |
|---|---|---|
| CN | 106210677 A | 12/2016 |
| CN | 109655989 A | 4/2019 |
| CN | 111602387 A | 8/2020 |
| CN | 112616007 A | 4/2021 |
| EP | 1207685 A2 | 5/2002 |
| JP | H09219867 A | 8/1997 |
| JP | 2012058435 A | 3/2012 |
| JP | 2020123862 A | 8/2020 |
| WO | 9717811 A1 | 5/1997 |
| WO | 2018003230 A1 | 1/2018 |
| WO | 2018003501 A1 | 1/2018 |

OTHER PUBLICATIONS

Notice of Reasons for Refusal issued in related Japanese Patent Application No. 2023-539310, dated Jul. 30, 2024, 7 pages.

International Search Report issued in corresponding International Application No. PCT/CN2021/142408, mailed Mar. 1, 2022, 6 pages.

First Office Action issued in corresponding CN Patent Application No. 202011639272.8, dated Nov. 22, 2021, 8 pages.

* cited by examiner

ELECTRONIC DEVICE, AND CAMERA MODULE THEREOF WITH MOVABLE PHOTOSENSITIVE SHIP

CROSS-REFERENCE TO RELATED APPLICATIONS

This application is a continuation of International Application No. PCT/CN2021/142408, filed Dec. 29, 2021, which claims priority to Chinese Patent Application No. 202011639272.8, filed Dec. 31, 2020. The entire contents of each of the above-referenced applications are expressly incorporated herein by reference.

TECHNICAL FIELD

This application relates to the field of communications device technologies, and in particular to an electronic device and a camera module thereof.

BACKGROUND

With the development of technologies, mobile phones and other electronic devices play an important role in people's production and life, and the electronic devices are usually equipped with camera modules to help users take photos. With the increasingly fierce market competition, an electronic device usually has at least one outstanding performance to stand out from other electronic devices, thereby improving the market competitiveness of the electronic device. For example, the electronic device has a high refresh rate, which makes it have a high display performance; the electronic device has two speakers, so that a sound effect is good; or further, the electronic device has high shooting performance. For the shooting performance of the electronic device, performance of a camera module can be improved in many ways.

Using imaging resolution as an example, when a size of a photosensitive chip is fixed, increasing a quantity of pixels reduces photosensitivity of the camera module, and also adversely affect an imaging result. Therefore, the industry usually uses single-frame interpolation and multi-frame synthesis to improve the resolution. However, in a process of forming an image by using the single-frame interpolation, because a quantity of real photosensitive pixels does not increase, improvement effect on the resolution is limited, and interpolation errors are also prone to occur in some scenarios. In a process of forming an image by using multi-frame synthesis, it is difficult to control pixel displacement, and the image quality after the synthesis is also poor.

SUMMARY

This application discloses an electronic device and a camera module thereof, which can improve image resolution.

According to a first aspect, embodiments of this application disclose a camera module. The camera module includes a lens, a driving member, and a photosensitive chip. The photosensitive chip is a Bayer array sensor, the photosensitive chip includes a plurality of pixel regions arranged in rows and columns, and each of the pixel region includes four pixel sub-regions.

The photosensitive chip is connected to the driving member, and the driving member can drive the photosensitive chip to switch between a first position and a second position relative to the lens.

In a case that the photosensitive chip is in the first position, light incident from the lens forms a first image in a first pixel sub-region of the photosensitive chip; in a case that the photosensitive chip is in the second position, light incident from the lens forms a second image in a second pixel sub-region of the photosensitive chip; and content of the first image and content of the second image are the same, and equivalent pixel sub-regions of the first pixel sub-region and the second pixel sub-region in the same pixel region are any two of the pixel sub-regions in the pixel region.

According to a second aspect, some embodiments of this application disclose an electronic device, including the foregoing camera module.

BRIEF DESCRIPTION OF DRAWINGS

The accompanying drawings described herein are intended to provide a further understanding of this application, and constitute a part of this application. Example embodiments of this application and descriptions thereof are intended to describe this application, and do not constitute limitations on this application. In the accompanying drawings.

DETAILED DESCRIPTION

To make the objectives, technical solutions, and advantages of this application clearer, the following describes the technical solutions of this application with reference to the specific embodiments of this application and the corresponding accompanying drawings. Apparently, the described embodiments are merely some rather than all of embodiments of this application. All other embodiments obtained by a person of ordinary skill in the art based on embodiments of this application without creative efforts shall fall within the protection scope of this application.

The technical solutions disclosed in embodiments of this application are described in detail below with reference to the accompanying drawings.

Figure 1:
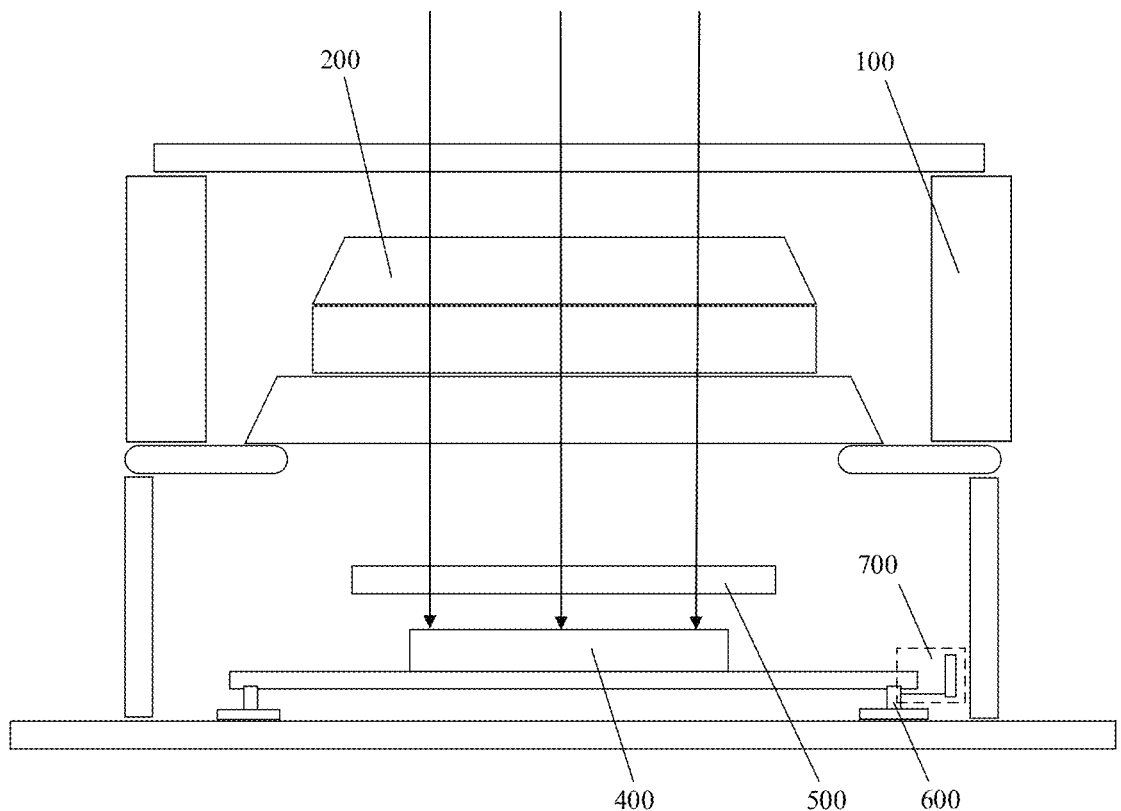
FIG. 1 is a schematic diagram depicting a structure of a camera module according to an embodiment of this application.
Figure 2:
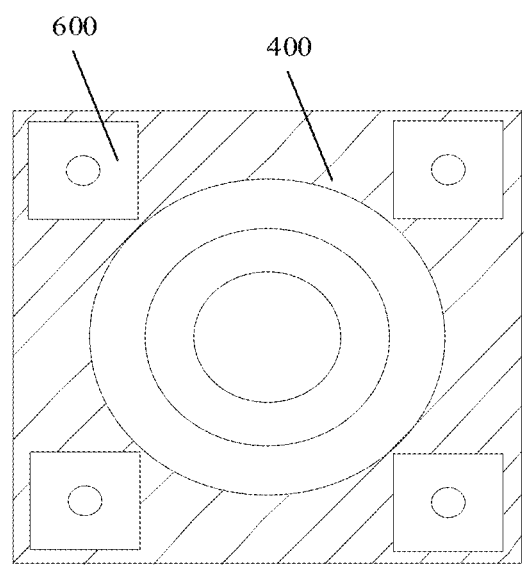
FIG. 2 is a diagram of assembly of a photosensitive chip and a limiting member in a camera module according to an embodiment of this application.
Figure 3:
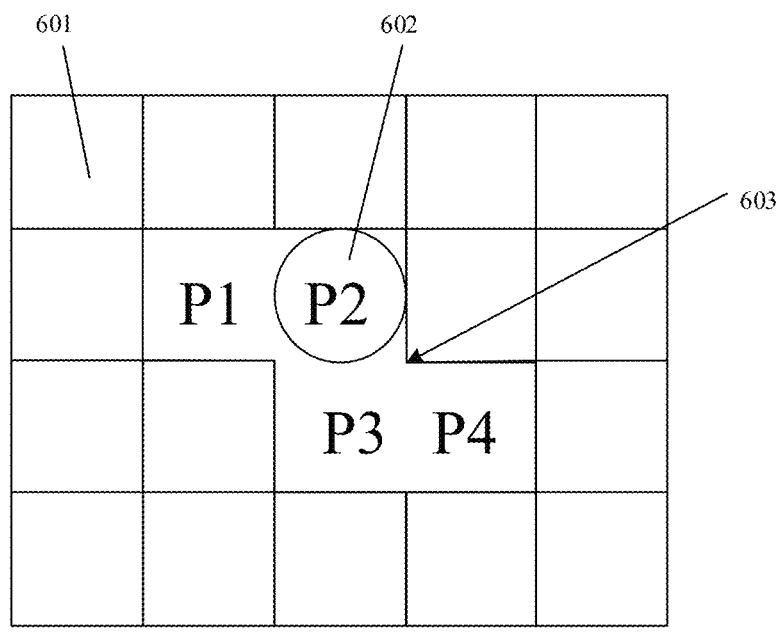
FIG. 3 is a schematic diagram of a limiting member in a camera module according to an embodiment of this application.

As shown in FIG. 1 to FIG. 3, this application discloses a camera module. The camera module includes a lens 200, a driving member 700, and a photosensitive chip 400. In addition, the camera module further includes a housing 100. All the foregoing devices can be installed on the housing 100. The housing 100 may be made from a material such as plastic or metal. The camera module may be provided with another structure. For brevity, details are not described herein again.

The photosensitive chip 400 is an imaging sensor, and the photosensitive chip 400 is a Bayer array sensor, that is, photosensitive pixels in the photosensitive chip 400 are arranged in a manner of a Bayer array. The photosensitive chip 400 includes a plurality of pixel regions arranged in rows and columns, each pixel region includes four pixel sub-regions, and the four pixel sub-regions are arranged in a 2×2 matrix. The four pixel sub-regions may include two green pixels, one blue pixel, and one red pixel, and the two green pixels are arranged diagonally. The four pixel sub-regions in each pixel region may be respectively a first pixel sub-region, a second pixel sub-region, a third pixel sub-region, and a fourth pixel sub-region.

In general, the photosensitive chip 400 may include a filtering array layer and a photosensitive layer. Light passes through the filtering array layer and shine on the photosensitive layer. The filtering array layer can filter colors, which can make the light that passes through the filtering array layer retain only one color such as red, blue, or green.

As mentioned above, the photosensitive chip 400 includes the plurality of pixel regions, and each pixel region includes the four pixel sub-regions. In detail, each pixel sub-region is a part of the photosensitive chip 400, that is, each pixel sub-region may include a filtering sublayer and a photosensitive sublayer, and there is a plurality of pixel sub-regions. Further, all filtering sublayers form the filtering array layer, and all photosensitive sublayers form the photosensitive layer.

In the filtering array layer of the Bayer array sensor, a part corresponding to each pixel region is provided with four filters, and the four filters correspond to four pixel sub-regions respectively in one pixel region. In addition, the above four filters usually include a red light filter, a blue light filter, and two green light filters, and the four filters are referred to as RGGB for short. In a case that types of the filters disposed in different pixel sub-regions of the photosensitive layer are different, colors of images formed by the regions corresponding to the different pixel sub-regions of the photosensitive layer are also different.

In the camera module provided in embodiments of this application, the photosensitive chip 400 is connected to the driving member 700, and the driving member 700 can drive the photosensitive chip 400 to move relative to the lens 200. The lens 200 can be kept fixed, and only the photosensitive chip 400 is controlled to move, so as to improve control accuracy, and reduce control difficulty.

In some embodiments, the lens 200 may be fixedly connected to the housing 100, and the photosensitive chip 400 can form a movable connection relationship with the housing 100 by using the driving member 700. The lens 200 may be fixed on the housing 100 in a manner such as bonding. The driving member 700 may be a miniature linear motor, and the like. The driving member 700 may be installed on the housing 100 by using a connecting part such as a screw, and the photosensitive chip 400 may be connected to a driving head of the driving member 700, so that the driving member 700 can drive the photosensitive chip 400 to move relative to the housing 100, that is, the photosensitive chip 400 and the lens 200 can generate relative movement.

In some embodiments, the driving member 700 can drive the photosensitive chip 400 to switch between a first position and a second position relative to the lens 200. In the foregoing case, a relative position between the lens 200 and the photosensitive chip 400 can be changed by adjusting the position of the photosensitive chip 400, so that the light incident from a same position on the lens 200 can be projected in different positions on the photosensitive chip 400, and images with same content are formed in different positions on the photosensitive chip 400.

In a case that the photosensitive chip 400 is in the first position, the light incident from the lens 200 forms a first image in the first pixel sub-region of the photosensitive chip 400. In a case that the photosensitive chip 400 is in the second position, the light incident from the lens 200 forms a second image in the second pixel sub-region of the photosensitive chip 400.

It should be noted that after one of the first image or the second image is formed, and the driving member 700 works to drive the photosensitive chip 400 to change the position thereof, the other image is formed. The photosensitive chip 400 may have a specific displacement between the two imaging processes relative to a framing region. However, edges of the image formed on the photosensitive chip 400 are not displayed in a finally-edited image, and the displacement of the photosensitive chip 400 is extremely small. Therefore, in a case that the camera module remains fixed as a whole, it can be considered that content of the images formed after the two imaging processes is basically the same, and further, it can be ensured that the content of the first image and the content of the second image formed in one pixel sub-region of the photosensitive chip 400 are the same.

Because the relative position between the lens 200 and the photosensitive chip 400 changes during the formation of the first image and the second image, the positions in which the light projected on the photosensitive chip 400 through the lens 200 can also change, that is, the first image is formed in the first pixel sub-region of the photosensitive chip 400, and the second photosensitive chip 400 is formed in the second pixel sub-region of the photosensitive chip 400.

In a case that the displacement of the photosensitive chip 400 is different, an interval between the first pixel sub-region and the second pixel sub-region is also different, so that there may be a case that the first pixel sub-region and the second pixel sub-region are not located in the same pixel region. However, even if the first pixel sub-region and the second pixel sub-region are located in two pixel regions respectively, because both the first pixel sub-region and the second pixel sub-region corresponds to filters, and structures of the plurality of pixel regions on the photosensitive chip 400 are the same, the pixel region in which the first pixel sub-region is located includes a pixel sub-region having a filter that is the same as the filter corresponding to the second pixel sub-region. Accordingly, the pixel region in which the second pixel sub-region is located also includes a pixel sub-region having a filter that is the same as the filter corresponding to the first pixel sub-region. Therefore, the first pixel sub-region may be equivalent to another pixel sub-region in the pixel region in which the second pixel sub-region is located. The equivalent pixel sub-regions of the first pixel sub-region and the second pixel sub-region in the same pixel region are any two pixel sub-regions in the pixel region, that is, the first pixel sub-region is not equivalent to the second pixel sub-region when the first pixel sub-region is equivalently located in the pixel region in which the second pixel sub-region is located. Accordingly, the second pixel sub-region is not equivalent to the first pixel sub-region when the second pixel sub-region is equivalently located in the pixel region in which the first pixel sub-region is located.

In a case that the foregoing technical solution is used, the foregoing light incident from the center of the lens 200 is used as an example, and the light is projected on the photosensitive chip 400 through the lens 200 to form the first image. Then, the photosensitive chip 400 is driven to move, so that the light incident from the center of the lens 200 is projected on the photosensitive chip 400 again, to form the second image.

A displacement and a displacement direction of the photosensitive chip 400 may be designed. That is, the foregoing light can be projected to a first pixel sub-region corresponding to a red filter in the photosensitive chip 400 in the first position through the lens 200, and the foregoing light can be projected to a second pixel sub-region corresponding to a green filter in the photosensitive chip 400 in the second position through the lens 200. In some embodiments, the foregoing light can first be projected to the first pixel sub-region corresponding to a blue filter in the photosensitive chip 400, and then to the second pixel sub-region corresponding to the green filter in the photosensitive chip 400. In some embodiments, the foregoing light can first be projected to a first pixel sub-region corresponding to a first green filter in the photosensitive chip 400, and then to a second pixel sub-region corresponding to a second green filter in the photosensitive chip 400. A red filter is adjacent to a lower part of the first green filter, a blue filter is adjacent to a right part of the first green filter, while a red filter is adjacent to an upper part of the second green filter, and a blue filter is adjacent to a left part of the second green filter. That is, a position of the first green filter is different from that of the second green filter in one pixel region.

In conclusion, a filter processing result of the foregoing light by a filter corresponding to the first pixel sub-region in the photosensitive chip 400 is different from a filtering processing result of the foregoing light by a filter corresponding to the second pixel sub-region in the photosensitive chip 400, so that the same light can be processed separately by two types of filters, and two images with the same content but different colors are formed. The first image and the second image are synthesized by using a preset algorithm, so that real photosensitive pixels of each filter channel on the synthesized image can be increased, and resolution of the image is improved, thereby making photos present better, and improving final image quality and user experience.

As mentioned above, the displacement and a displacement direction of the photosensitive chip 400 may be designed so that the first image and the second image formed have the same content but different colors. In some embodiments, the displacement of the photosensitive chip 400 may be a side length of the pixel sub-region, and the displacement direction of the photosensitive chip 400 may be an extending direction of an edge of the pixel sub-region, or the displacement of the photosensitive chip 400 may be the sum of the side length of the pixel sub-region and the side lengths of n pixel regions, where n is an integer, and n>0.

In addition, moving directions of the photosensitive chip 400 may be determined according to an actual situation. For example, the photosensitive chip 400 may generate a displacement of the side length of a pixel sub-region leftward in a plane perpendicular to an optical axis of the photosensitive chip, or the photosensitive chip 400 may generate a displacement of the side length of a pixel sub-region downward in a plane perpendicular to an optical axis of the photosensitive chip, or the photosensitive chip 400 may generate a displacement of a size of a diagonal of a pixel sub-region toward the lower left in a plane perpendicular to an optical axis of the photosensitive chip. This is not limited herein. In addition, in a case that the moving directions of the photosensitive chip 400 are different, types of the filters corresponding to the first pixel sub-region and the second pixel sub-region are also different.

Figure 4:
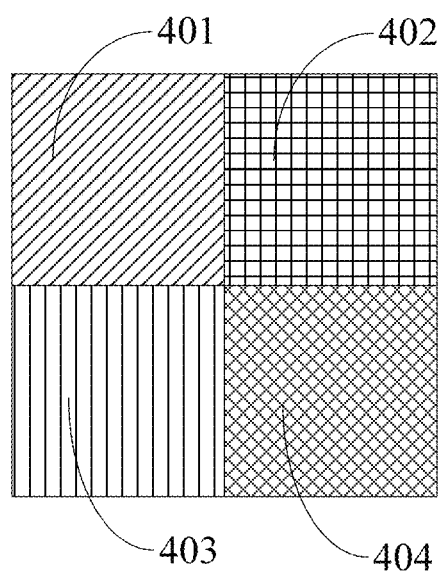
FIG. 4 is a schematic diagram of a structure of a pixel region of a photosensitive chip in a camera module according to an embodiment of this application.

More intuitively, as shown in FIG. 4, FIG. 4 shows distribution of the four pixel sub-regions in each pixel region of the photosensitive chip 400, namely, a first pixel sub-region 401, a second pixel sub-region 402, a third pixel sub-region 403, and a fourth pixel sub-region 404. The first pixel sub-region 401 of the photosensitive chip 400 in the first position faces the center of the lens 200. That is, in a case that the photosensitive chip 400 is in the first position, the light incident from the center of the lens 200 may be projected to the first pixel sub-region 401. Correspondingly, after the position of the photosensitive chip 400 changes, a correspondence between the lens 200 and the photosensitive chip 400 also changes. In some embodiments, after the photosensitive chip 400 moves to the second position, a second pixel sub-region 402' faces the center of the lens 200. That is, in a case that the photosensitive chip 400 is in the second position, the light incident from the center of the lens 200 may be projected to the second pixel sub-region 402'. Although the second pixel sub-region 402' and the second pixel sub-region 402 may correspond to the same type filter, the two pixel sub-regions may also be respectively located in two pixel regions, and a pixel region in which the second pixel sub-region 402' is located further includes a first pixel sub-region 401', a third pixel sub-region 403', and a fourth pixel sub-region 404'.

Figure 5:
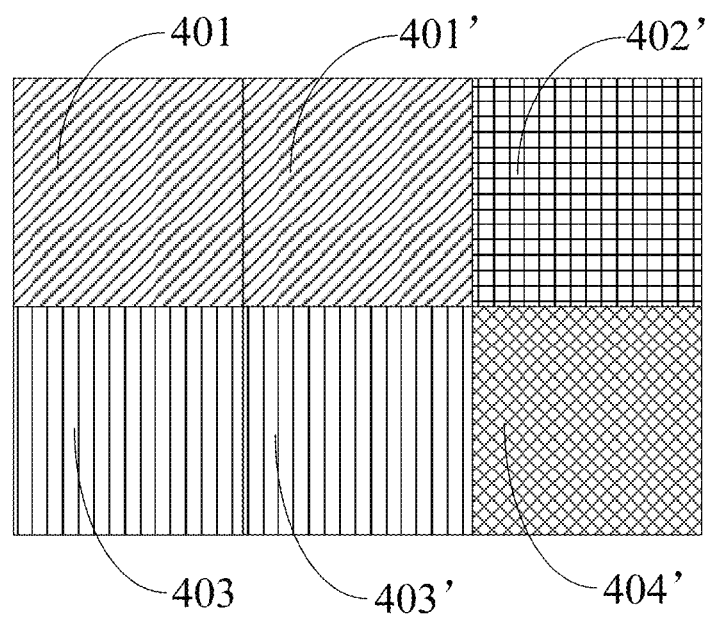
FIG. 5 is a diagram of comparison of relative positions between a pixel region in which a first pixel sub-region is located and a pixel region in which a second pixel sub-region is located in a camera module according to an embodiment of this application.
Figure 6:
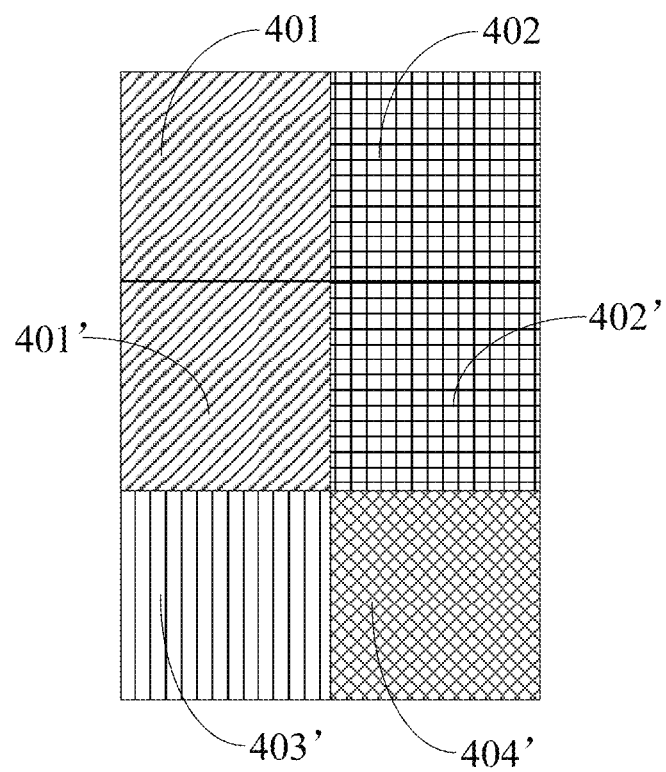
FIG. 6 is another diagram of comparison of relative positions between a pixel region in which a first pixel sub-region is located and a pixel region in which a second pixel sub-region is located in a camera module according to an embodiment of this application.
Figure 7:
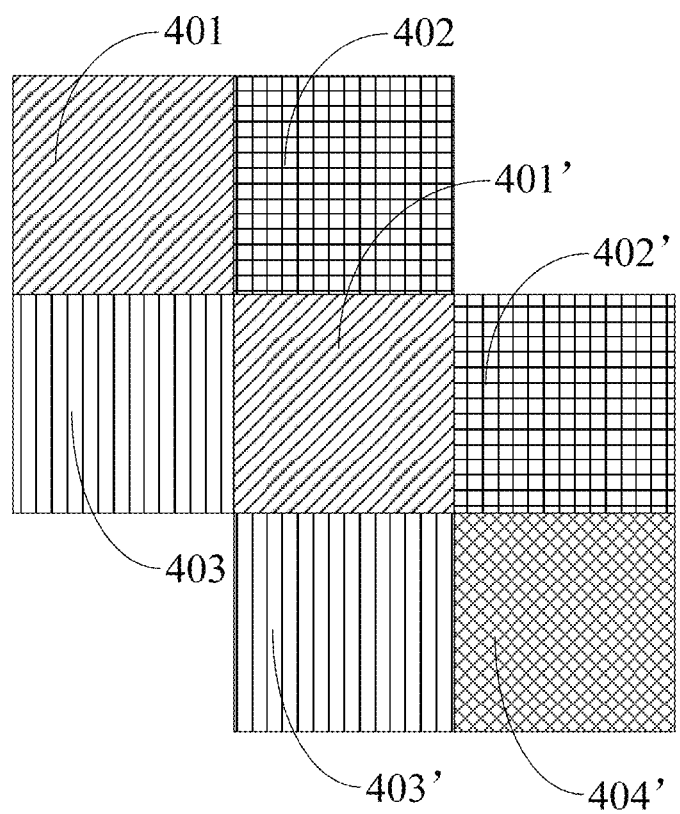
FIG. 7 is still another diagram of comparison of relative positions between a pixel region in which a first pixel sub-region is located and a pixel region in which a second pixel sub-region is located in a camera module according to an embodiment of this application.

In a process of driving the photosensitive chip 400 to move, the photosensitive chip 400 may generate a displacement of the side length of a pixel sub-region leftward or downward in the plane perpendicular to the optical axis of the photosensitive chip, or generate a displacement of a length of a diagonal of a pixel sub-region toward the lower left in the plane perpendicular to the optical axis of the photosensitive chip, so that the relative positions between the pixel region where the first pixel sub-region 401 is located and the pixel region where the second pixel sub-region 402' is located separately correspond to FIG. 5 to FIG. 7.

Embodiments of this application provide the camera module. The lens of the camera module fits the photosensitive chip, and the photosensitive chip 400 can switch between the first position and the second position, so that the first image and the second image can be respectively formed in the first pixel sub-region and the second pixel sub-region of the photosensitive chip in a case that a position of the photosensitive chip 400 changes. The content of the first image and the content of the second image are the same. In addition, the equivalent pixel sub-regions of the first pixel sub-region and the second pixel sub-region in the same pixel region are any two of the pixel regions, so that filtering processing results of the incident light by the photosensitive chip are different during the two imaging processes. Further, the first image and the second image are synthesized by using a preset algorithm, so that real photosensitive pixels of each filter channel on the formed synthesized image can be increased, and resolution of the image is improved, thereby making photos present better, and improving final image quality and user experience.

In the camera module provided in embodiments of this application, the driving member 700 may drive the photosensitive chip 400 to a third position. That is, the driving member 700 may drive the photosensitive chip 400 to switch between the first position, the second position, and the third position relative to the lens 200. In some embodiments, there are a plurality of the driving members 700, or the driving member 700 can provide driving forces in different directions. In a case that the photosensitive chip 400 is in the third position, the light incident from the lens 200 forms a third image in a third pixel sub-region of the photosensitive chip 400, content of the third image and content of the first image are the same, and equivalent pixel sub-regions of the first pixel sub-region, the second pixel sub-region, and the third pixel sub-region in the same pixel region are any three of the pixel sub-regions in the pixel region.

By using the foregoing technical solution, types of the filter processing results of the same light can be increased. After the first image, the second image, and the third image are synthesized by the preset algorithm, the real photosensitive pixels of each filter channel on the synthesized image can be further increased to further improve resolution of the image. In some embodiments, by controlling the moving directions of the photosensitive chip 400, the relative position relationship between the photosensitive chip 400 and the lens 200 can be changed, and then the pixel sub-region corresponding to the light incident from the lens 200 can be changed. That is, the type of the filter through which the light incident from the lens 200 passes can be changed, so as to enhance the filtering processing results of the same light. In some embodiments, the first pixel sub-region, the second pixel sub-region, and the third pixel sub-region can correspond to the green filter, the red filter, and the blue filter respectively, so that the resolution of the photosensitive pixels corresponding to RGB in the image can be improved, thereby making the formed image better.

Further, in the camera module provided in embodiments of this application, the driving member 700 can also drive the photosensitive chip 400 to move to a fourth position P4, as shown by the example in FIG. 3. That is, the driving member 700 can drive the photosensitive chip 400 to switch between the first position P1, the second position P2, the third position P3, and the fourth position P4 relative to the lens 200. In a case that the photosensitive chip 400 is in the fourth position P4, the light incident from the lens 200 forms a fourth image in a fourth pixel sub-region of the photosensitive chip 400, content of the fourth image and content of the first image are the same, and equivalent pixel sub-regions of the first pixel sub-region, the second pixel sub-region, the third pixel sub-region, and the fourth pixel sub-region in the same pixel region are four of the pixel sub-regions in the pixel region.

By using the foregoing technical solution, types of the filter processing results of the same light can be increased. After the first image, the second image, the third image, and the fourth image are synthesized by the preset algorithm, the real photosensitive pixels of each filter channel on the synthesized image can be further increased to further improve resolution of the image. When the foregoing technical solution is used, compared with the solution in which the light is directly incident on the photosensitive chip, resolution of an R image and a B image is tripled, and resolution of a G image is doubled, thereby greatly improving resolution of the image.

In a process in which the driving member 700 drives the photosensitive chip 400 to move, by precisely controlling a driving amount of the driving member 700, it can be ensured that the photosensitive chip 400 can move a preset displacement when moving, and the preset displacement can be a side length of a pixel sub-region. To reduce difficulty of controlling the camera module, in some embodiments of this application, the camera module further includes a limiting member 600, and the photosensitive chip is in movable fit with the lens by using the limiting member.

The limiting member 600 includes a limiting base 601 and a connecting part 602, and the limiting base 601 is movably connected to the connecting part 602. The photosensitive chip 400 and the driving head of the driving member 700 may both be connected to the limiting base 601, or may both be connected to the connecting part 602, so that the displacement of the photosensitive chip 400 can be controlled by a limiting fit relationship between the limiting base 601 and the connecting part 602. For example, the limiting base 601 can be fastened onto the housing 100, and the photosensitive chip 400 and the driving head of the driving member 700 are both connected to the connecting part 602.

The limiting base 601 is provided with a first limiting groove, a second limiting groove, a third limiting groove, and a fourth limiting groove. The first limiting groove, the second limiting groove, the third limiting groove, and the fourth limiting groove are connected to each other to form a movable space 603, so as to ensure that the connecting part 602 can move in the movable space and is in limiting fit with the above four limiting grooves.

Moreover, in a case that the connecting part 602 is limited in the first limiting groove, as shown by the example in FIG. 3, the photosensitive chip 400 is located in the first position PI; in a case that the connecting part 602 is limited in the second limiting groove, the photosensitive chip 400 is located in the second position P2; in a case that the connecting part 602 is limited in the third limiting groove, the photosensitive chip 400 is located in the third position P3; and in a case that the connecting part 602 is limited in the fourth limiting groove, the photosensitive chip 400 is located in the fourth position P4.

Usually, by using the foregoing technical solution, the displacement of the photosensitive chip 400 may be limited by the limiting member 600. When the photosensitive chip 400 needs to be moved, the connecting part is driven to move to a corresponding position by the driving member 700, and the limiting base 601 can provide a reliable limiting function, so that when the connecting part cannot continue to move in the corresponding direction, it can be considered that the photosensitive chip 400 has been driven to a target position, which reduces difficulty of controlling the driving amount of the driving member 700 by the driving member 700.

In some embodiments, specific sizes and structures of the first limiting groove, the second limiting groove, the third limiting groove, and the fourth limiting groove may be determined according to an actual condition such as a size and shape of the connecting part. The first limiting groove, the second limiting groove, the third limiting groove, and the fourth limiting groove may all be square mechanical parts, and sizes thereof are the same as that of the pixel sub-region. Correspondingly, to ensure that the connecting part can be normally limited, the connecting part can also be a cylindrical structure with a square bottom.

In some embodiments, the four limiting grooves may be connected to each other to form a square structure, that is, the four limiting grooves respectively correspond to the four pixel sub-regions in the pixel region, and are distributed in a 2×2 form. In this case, when the connecting part 602 and the four limiting grooves are in fit with each other, the photosensitive chip 400 may be separately located in the first position, the second position, the third position, and the fourth position, thereby separately forming the first image, the second image, the third image, and the fourth image on the photosensitive chip 400.

In some embodiments of this application, the second limiting groove is connected to the third limiting groove, the first limiting groove is located on one side along a distribution direction of the second limiting groove and the third limiting groove, and the fourth limiting groove is located on the other side of the distribution direction. The first limiting groove is connected to the second limiting groove, and the fourth limiting groove is connected to the third limiting groove. In general, it can be considered that the second limiting groove is connected to the right part of the first limiting groove, the third limiting groove is connected to the lower part of the second limiting groove, and the fourth limiting groove is connected to the right part of the third limiting groove, so as to form a Z-shaped structure.

In a case that the foregoing technical solution is used, when the connecting part 602 moves between any adjacent two of the foregoing four limiting grooves, the connecting part 602 can be limited by the limiting base 601 in a certain direction, and by combining driving forces provided by the driving member 700, the moving direction of the connecting part 602 can be made unique, further reducing the driving difficulty and improving the movement precision.

As described above, a size of the first limiting groove and the like on the limiting base may be determined based on parameters such as the structure and size of the connecting part. In some embodiments, in the distribution direction of the first limiting groove and the second limiting groove, and in the distribution direction of the second limiting groove and the third limiting groove, the size of the connecting part is equal to the size of the pixel sub-region. In this case, the shapes and sizes of bottom surfaces of the first limiting groove, the second limiting groove, the third limiting groove, and the fourth limiting groove are the same as the shape and size of the pixel sub-region respectively correspondingly, so that design and processing difficulty of the first limiting groove and the like are lower, and it can be ensured that there is a more reliable limiting relationship between the connecting part and each limiting groove. In some embodiments, the connecting part may be a cylindrical mechanical part with a square bottom. In some embodiments, the connecting part 602 may be a cylindrical mechanical part. In this case, a contact area between the connecting part 602 and the limiting base 601 is small, which can reduce the difficulty of their relative movement and difficulty of driven movements.

The optical axis of the lens is perpendicular to a photosensitive surface of the photosensitive chip 400, that is, the photosensitive chip faces the lens. In this case, design and installation difficulty of the lens and the photosensitive chip are lower, sensitivity of the photosensitive chip 400 may be improved, and imaging quality is improved. In a case that here is a corresponding requirement, the photosensitive chip 400 may unnecessarily be opposite the lens 200. For example, the camera module may be set as a periscope module, which can improve a zoom ratio of the camera module.

The camera module provided in embodiments of this application further includes an infrared cut-off filter 500. The infrared cut-off filter 500 is disposed on an out-light side of the lens, that is, on a light input side of the photosensitive chip 400. The infrared cut-off filter 500 can provide a filtering effect for light incident into the camera module through the lens 200, thereby filtering out unnecessary light projected into the photosensitive chip 400, preventing the photosensitive chip 400 from producing false colors and/or ripples, and improving the effective resolution and color reproduction of the photosensitive chip 400.

In some embodiments, the lens 200 is an extended depth of field lens. Passing focuses of R, G, and B filter channels of the lens 200 are designed to be located at different positions, and the three passing focuses cover three focal segments, so that longitudinal chromatic aberration of the R, G, and B bands is enlarged to cover far, middle, and near distances. The far, middle, and near distances are relative concepts. That is, the far distance is a greater distance compared with the middle distance, and the near distance is a shorter distance compared with the middle distance.

The lens 200 uses the foregoing technical solution, three photos correspond to R, G, and B, and the three photos focus on the foregoing three distances, namely, far, middle, and near. After this, based on a restoration algorithm, a window detection function may be used to detect the entire field of view region, and determine which of the three photos corresponding to R, G, and B in each window is the clearest. Then, based on the clearest photo, the other two photos can be used for resolution transformation with the help of a deconvolution algorithm to synthesize photos that are relatively clear in any distance.

On the basis of the camera module disclosed in any of the foregoing embodiments, some embodiments of this application further provide an electronic device, the electronic device includes the camera module provided in any of the foregoing embodiments. The electronic device further includes a display module, a housing, a battery, and other devices. For brevity, details are not described herein again.

The electronic device disclosed in embodiments of this application may be a smart phone, a tablet computer, an e-book reader, or a wearable device. The electronic device may also be another device. This is not limited in embodiments of this application.

The foregoing embodiments of this application focus on describing differences between the embodiments, and different optimization features of the embodiments may be combined to form better embodiments provided that they are not contradictory. For brevity, details are not described herein again.

The foregoing descriptions are merely embodiments of this application, and are not intended to limit this application. Various changes and modifications may be made to this application by a person skilled in the art. Any modifications, equivalent substitutions, improvements, and the like made within the spirit and principle of this application should be included within the scope of the claims of this application.

The invention claimed is:

1. A camera apparatus, comprising:
    a lens;
    a driving member:
    a limiting member; and
    a photosensitive chip, wherein the photosensitive chip is a Bayer array sensor comprising a plurality of pixel regions arranged in rows and columns, and each pixel region comprises four pixel sub-regions,
    wherein the photosensitive chip is connected to the driving member, the photosensitive chip is in movable fit with the lens through the limiting member, the limiting member comprises a limiting base and a connecting component, and the limiting base or the connecting component is connected to the driving member; the limiting base is provided with a first limiting groove, a second limiting groove, a third limiting groove and a fourth limiting groove that communicate with each other, the second limiting groove is connected to the third limiting groove, the first limiting groove is located on one side of an arranging direction of the second limiting groove and the third limiting groove, the fourth limiting groove is located on the other side of the arranging direction, the first limiting groove is connected to the second limiting groove, and the fourth limiting groove is connected to the third limiting groove; and the driving member is configured to drive the photosensitive chip to move among a first position, a second position, a third position, and a fourth position, relative to the lens, wherein when the connecting component is limited in the first limiting groove, the photosensitive chip is at the first position, and light incident from the lens forms a first image in a first pixel sub-region of the photosensitive chip; wherein when the connecting component is limited in the second limiting groove, the photosensitive chip is at the second position, and light incident from the lens forms a second image in a second pixel sub-region of the photosensitive chip; when the connecting component is limited in the third limiting groove, the photosensitive chip is in the third position, and light incident from the lens forms a third image in a third sub-pixel region of the photosensitive chip; when the connecting component is limited in the fourth limiting groove, the photosensitive chip is in the fourth position, and light incident from the lens forms a fourth image in a fourth sub-pixel region of the photosensitive chip; and wherein content of the first image, content of the second image, content of the third image, and content of the fourth image are the same, and -equivalent pixel sub-regions of the first pixel sub-region, the second pixel sub-region, the third pixel sub-region, and the third pixel sub-region in the same pixel region are any four of the pixel sub-regions in the pixel region.

2. The camera apparatus according to claim 1, wherein in a distribution direction of the first limiting groove and the second limiting groove, and in a distribution direction of the second limiting groove and the third limiting groove, a size of the connecting part is equal to a side length of the pixel sub-region.

3. The camera apparatus according to claim 2, wherein the connecting part is a cylindrical mechanical part.

4. The camera apparatus according to claim 1, wherein the camera apparatus further comprises an infrared cut-off filter, and the infrared cut-off filter is disposed on an out-light side of the lens.

5. The camera apparatus according to claim 1, wherein the lens is an extended depth of field lens.

6. An electronic device, comprising a camera apparatus, wherein the camera apparatus comprises:
a lens;
a driving member;
a limiting member; and
a photosensitive chip, wherein the photosensitive chip is a Bayer array sensor comprising a plurality of pixel regions arranged in rows and columns, and each pixel region comprises four pixel sub-regions, wherein the photosensitive chip is connected to the driving member, the photosensitive chip is in movable fit with the lens through the limiting member, the limiting member comprises a limiting base and a connecting component, and the limiting base or the connecting component is connected to the driving member; the limiting base is provided with a first limiting groove, a second limiting groove, a third limiting groove, and a fourth limiting groove that communicate with each other, the second limiting groove is connected to the third limiting groove, the first limiting groove is located on one side of an arranging direction of the second limiting groove and the third limiting groove, the fourth limiting groove is located on the other side of the arranging direction, the first limiting groove is connected to the second limiting groove, and the fourth limiting groove is connected to the third limiting groove; and the driving member is configured to drive the photosensitive chip to move between among a first position, a second position, a third position, and a fourth position, relative to the lens, wherein when the connecting component is limited in the first limiting groove the photosensitive chip is at the first position, and light incident from the lens forms a first image in a first pixel sub-region of the photosensitive chip: wherein when the connecting component is limited in the second limiting groove, the photosensitive chip is at the second position, and light incident from the lens forms a second image in a second pixel sub-region of the photosensitive chip; when the connecting component is limited in the third limiting groove, the photosensitive chip is in the third position, and light incident from the lens forms a third image in a third sub-pixel region of the photosensitive chip; when the connecting component is limited in the fourth limiting groove, the photosensitive chip is in the fourth position, and light incident from the lens forms a fourth image in a fourth sub-pixel region of the photosensitive chip; and wherein content of the first image, content of the second image, content of the third image, and content of the fourth image are the same, and equivalent pixel sub-regions of the first pixel sub-region, the second pixel sub-region, the third pixel sub-region, and the third pixel sub-region in the same pixel region are any four of the pixel sub-regions in the pixel region.

7. The electronic device according to claim 6, wherein in a distribution direction of the first limiting groove and the second limiting groove, and in a distribution direction of the second limiting groove and the third limiting groove, a size of the connecting part is equal to a side length of the pixel sub-region.

8. The electronic device according to claim 7, wherein the connecting part is a cylindrical mechanical part.

9. The electronic device according to claim 6, wherein the camera apparatus further comprises an infrared cut-off filter, and the infrared cut-off filter is disposed on an out-light side of the lens.

10. The electronic device according to claim 6, wherein the lens is an extended depth of field lens.

* * * * *